(12) United States Patent
Yamashita

(10) Patent No.: US 7,623,773 B2
(45) Date of Patent: Nov. 24, 2009

(54) ACCESSORY DEVICE FOR IMAGE-PICKUP APPARATUS

(75) Inventor: Kenichirou Yamashita, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 11/965,212

(22) Filed: Dec. 27, 2007

(65) Prior Publication Data
US 2008/0170843 A1    Jul. 17, 2008

(30) Foreign Application Priority Data
Jan. 17, 2007    (JP) ............................. 2007-007592

(51) Int. Cl.
*G03B 17/08* (2006.01)
*G03B 15/03* (2006.01)
(52) U.S. Cl. ........................................ 396/29; 396/198
(58) Field of Classification Search ................... 396/29, 396/198, 544; 348/81, 370, 371, 375
See application file for complete search history.

(56) References Cited

U.S. PATENT DOCUMENTS

| | | | | |
|---|---|---|---|---|
| 4,555,747 A | * | 11/1985 | Tsuruta | 362/3 |
| 4,666,276 A | * | 5/1987 | Chan | 396/180 |
| 5,630,183 A | * | 5/1997 | Hagiuda et al. | 396/198 |
| 6,546,204 B2 | * | 4/2003 | Hagiuda et al. | 396/155 |
| 2003/0214593 A1 | * | 11/2003 | Takematsu | 348/275 |
| 2005/0117897 A1 | * | 6/2005 | Funahashi et al. | 396/27 |

FOREIGN PATENT DOCUMENTS

| | | |
|---|---|---|
| JP | 09-211562 | 8/1997 |
| JP | 9211562 A * | 8/1997 |

* cited by examiner

*Primary Examiner*—W. B. Perkey
*Assistant Examiner*—Noam Reisner
(74) *Attorney, Agent, or Firm*—Cowan, Liebowitz & Latman, P.C.

(57) ABSTRACT

An accessory device mountable to an accessory shoe of an image-pickup apparatus includes a contact member electrically connecting with the accessory shoe, a lock mechanism allowing a lock operation for fixing the accessory device to the accessory shoe and an unlock operation for releasing the fix of the accessory device, a drip-proof member contacting the image-pickup apparatus to form a drip-proof space around the contact member and the accessory shoe. In response to the lock operation, the drip-proof member is moved to a first position where the drip-proof member is allowed to be brought into contact with the image-pickup apparatus. In response to the unlock operation, the drip-proof member is moved to a second position where the drip-proof member is retracted from the first position. The drip-proof member has a shape such that a length of a rear-end-side portion is longer than that of the front-end-side portion.

3 Claims, 8 Drawing Sheets

ACCESSORY DEVICE FOR IMAGE-PICKUP APPARATUS

BACKGROUND OF THE INVENTION

The present invention relates to an accessory device such as a flash device that is mounted to an accessory shoe provided in an image-pickup apparatus.

Many image-pickup apparatuses such as digital still cameras and video cameras are equipped with an accessory shoe, on which an accessory device such as a flash device can be detachably mounted. Allowing for the image-pickup in the rain or near water with such an accessory device mounted to the accessory shoe, a drip-proof structure has to be provided around the accessory shoe.

Japanese Patent Laid-Open No. 9(1997)-211562 discloses such a drip-proof structure around the accessory shoe in a camera, for example. In this drip-proof structure, a packing is attached to a flat base portion of a shoe provided in the flash device, so that when the shoe of the flash device is assembled with the accessory shoe of the camera, the packing fills the gap around terminals so as to prevent the intrusion of rainwater or the like.

The accessory shoe with the drip-proof structure disclosed in Japanese Patent Laid-Open No. 9(1997)-211562, however, has a totally different configuration from an accessory shoe that has been used conventionally for cameras and accessory devices. For that reason, the disclosed accessory shoe is not compatible with the cameras and the accessory devices provided with the conventional accessory shoe. When a conventional camera or accessory device is used, a special adaptor has to be prepared, which is inconvenient for users.

BRIEF SUMMARY OF THE INVENTION

The present invention provides an accessory device that is applicable to an accessory shoe of the same configuration as that of a conventional one and capable of realizing an excellent drip-proof structure around an accessory shoe and also provides an image-pickup system including this accessory device.

According to an aspect, the present invention provides an accessory device detachably mounted to an accessory shoe of an image-pickup apparatus including a contact member that electrically connects with the accessory shoe, a lock mechanism that allows a lock operation for fixing the accessory device to the accessory shoe and an unlock operation for releasing the fix of the accessory device, a drip-proof member that forms a drip-proof space around the contact member and the accessory shoe when the drip-proof member contacts the image-pickup apparatus, and a moving mechanism that moves, in response to the lock operation, the drip-proof member to a first position where the drip-proof member is allowed to be brought into contact with the image-pickup apparatus, and that moves, in response to the unlock operation, the drip-proof member to a second position where the drip-proof member is retracted from the first position. The accessory device is mounted to the accessory shoe in a first direction orthogonal to a second direction in which the drip-proof member moves between the first and second positions. The drip-proof member has a front-end-side portion and a rear-end-side portion in the first direction and has a shape such that a length of the rear-end-side portion in the second direction is longer than that of the front-end-side portion to avoid at the second position an interference with the accessory shoe during mounting of the accessory device to the accessory shoe.

According to another aspect, the present invention provides an image-pickup apparatus including an accessory shoe to which the above-stated accessory device is detachably mounted, and a contacted member with which the drip-proof member of the accessory device mounted to the accessory shoe is brought into contact when the drip-proof member is located at the first position. The contacted member has a front-end-side portion and a rear-end-side portion in the first direction and has a shape such that a height of the rear-end-side portion of the contacted member in the second direction is lower than that of the front-end-side portion thereof.

Other aspects of the present invention will be apparent from the embodiment described below with reference to the drawings.

DETAILED DESCRIPTION OF THE PREFERRED EMBODIMENTS

An exemplary embodiment of the present invention will be described below with reference to the accompanied drawings.

Figure 1:
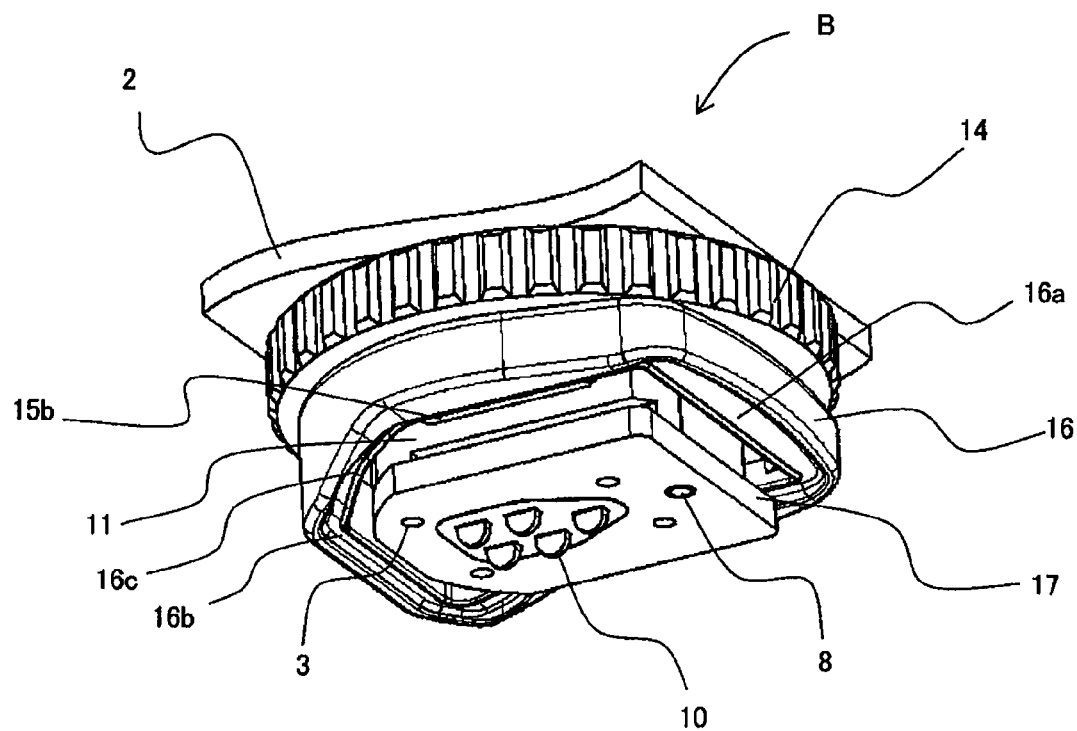
FIG. 1 is a perspective view showing an accessory-shoe connection part provided in a flash device that is Embodiment 1 of the present invention.
Figure 2:
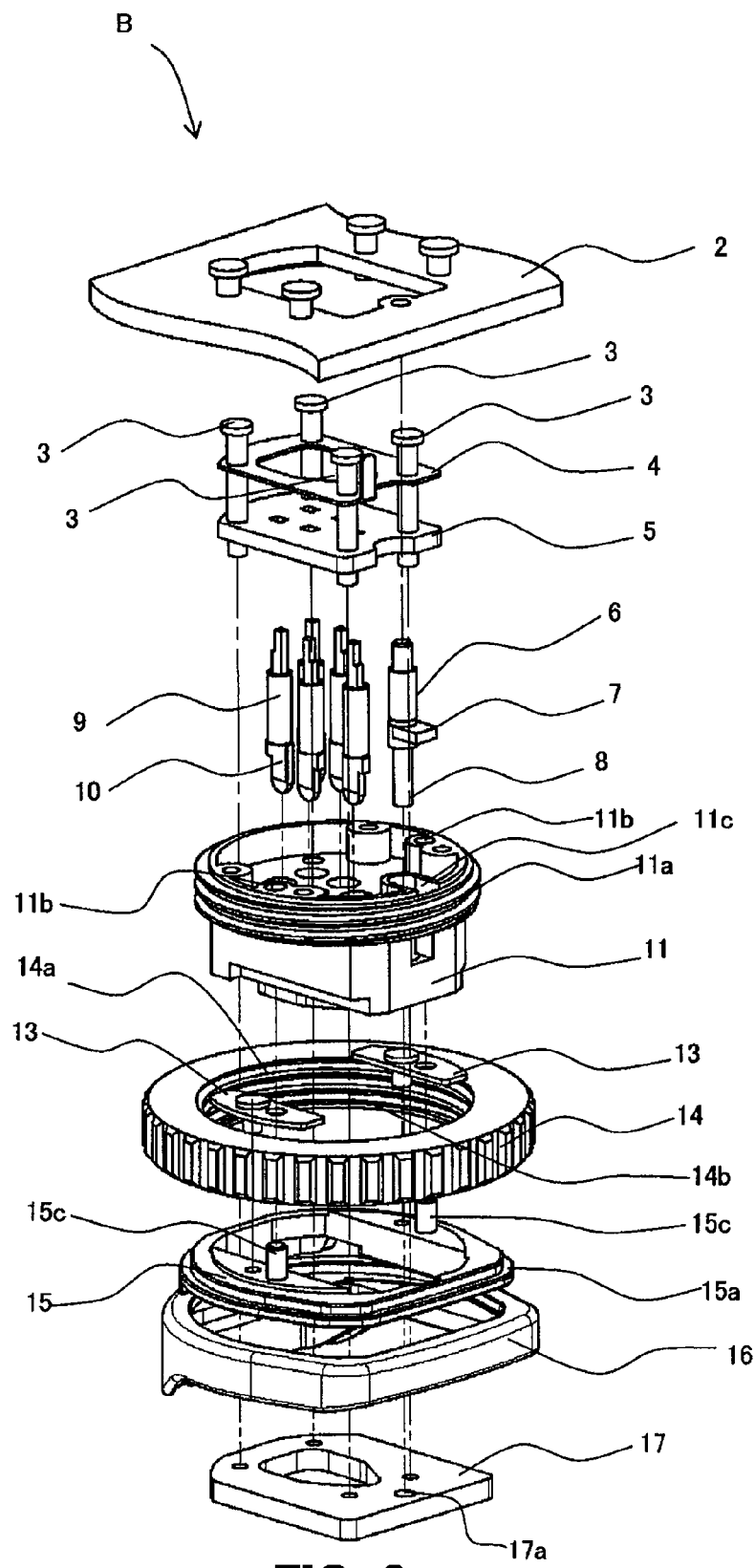
FIG. 2 is an exploded perspective view of the accessory-shoe connection part.
Figure 3:
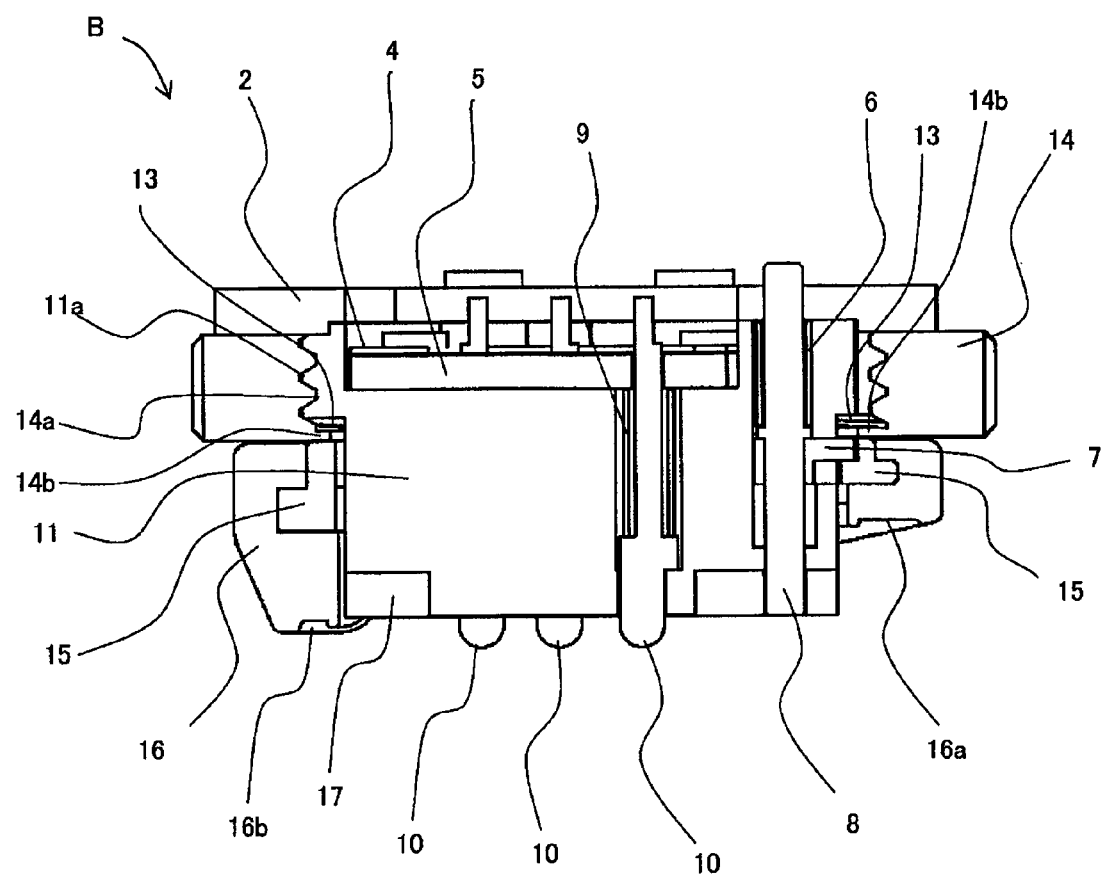
FIG. 3 is a cross-sectional view of the accessory-shoe connection part (unlock state)

FIGS. 1 to 3 show the configuration of a connection part B of an accessory device that is one embodiment of the present invention for connecting with an accessory shoe provided in an image-pickup apparatus (digital still camera, video camera or the like). The connection part B is hereinafter referred to as the accessory-shoe connection part B.

Although this embodiment describes a flash device for illuminating an object with flashlight as a typical accessory device, the present invention is applicable to accessory devices other than the flash device as well.

FIG. 1 is a perspective view showing the accessory-shoe connection part B when viewed from obliquely below, and FIG. 2 is an exploded perspective view of the accessory-shoe connection part B. FIG. 3 is a cross-sectional view of the accessory-shoe connection part B, showing an unlock state of the accessory-shoe connection part B.

Figure 4:
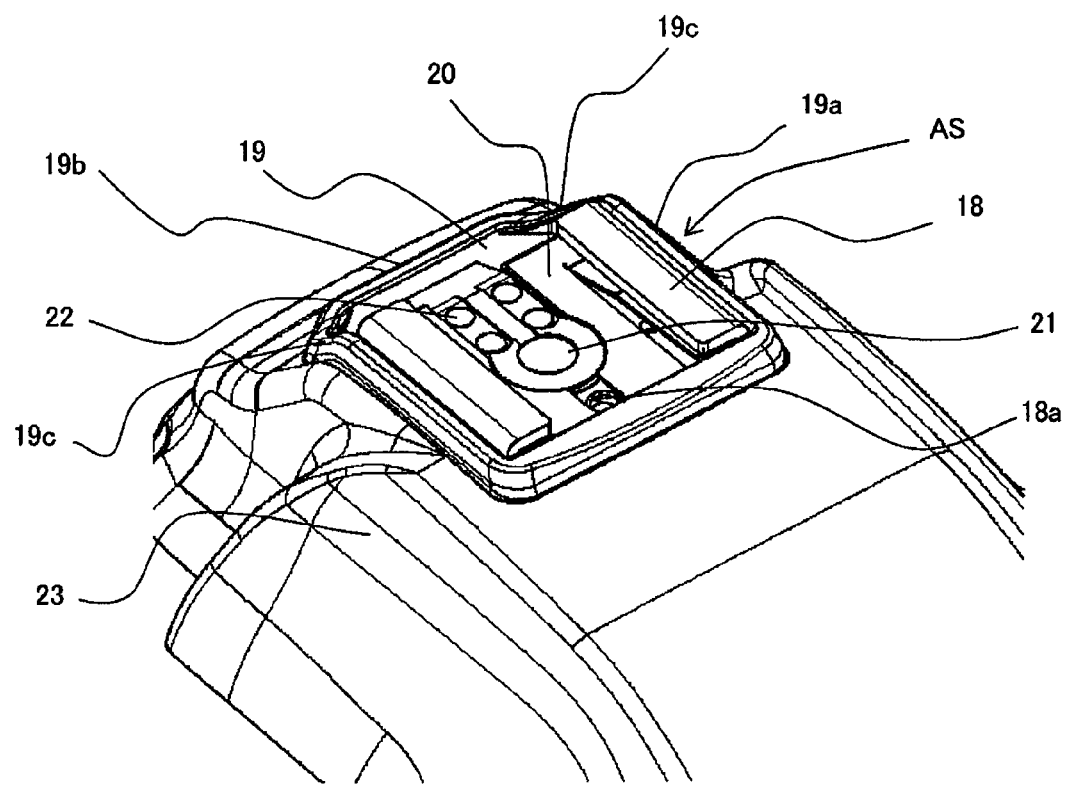
FIG. 4 is a perspective view showing an accessory shoe of a camera to which the flash device is mounted.
Figure 5:
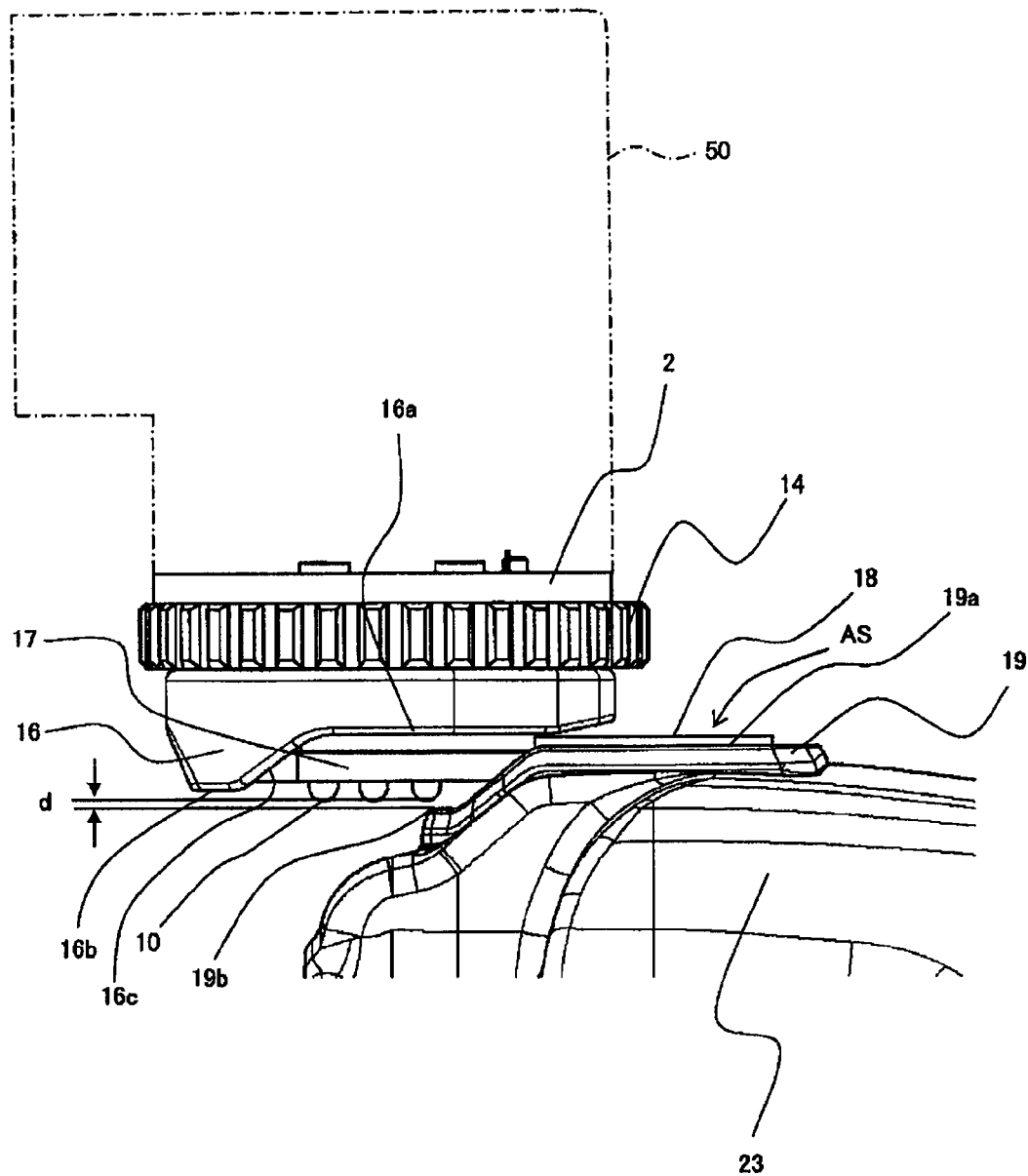
FIG. 5 is a side view showing a state during the course when the above-stated flash device is mounted to the camera.

FIG. 4 shows an accessory shoe AS provided in an image-pickup apparatus (hereinafter referred to as a camera) when viewed from obliquely above. FIG. 5 shows a state during the course when the accessory device is mounted to the accessory shoe AS of the camera. In FIGS. 4 and 5, reference numeral 23 denotes an exterior member of the camera. In FIG. 5, reference numeral 50 denotes an accessory device such as a flash device having the accessory-shoe connection part B. The flash device 50 is hereinafter referred to as the flash device in the following description.

In FIGS. 1 to 3, reference numeral 2 denotes a lower-face exterior member of the flash device 50, which is simplified in the drawings. Reference numeral 11 denotes a shoe mold made of resin, which is attached to the lower-face exterior member 2. Reference numeral 17 denotes a shoe bracket as an engaging member that is attached to a lower portion of the shoe mold 11. The shoe bracket 17 is inserted into a shoe plate as a later described engaged member serving as an accessory shoe of the camera and engages therewith. The shoe bracket 17 has a shape and a size that can be inserted into an accessory shoe (shoe plate) with a conventional configuration. Thus, the flash device 50 is compatible with a camera provided with the accessory shoe with the conventional configuration.

Reference numeral 14 denotes a tightening ring as an operation member serving as part of a lock mechanism. On an inner circumference of the tightening ring 14, a screw portion 14a is formed so as to engage with a screw portion 11a formed on an outer circumference of the shoe mold 11. Thereby, the tightening ring 14 is attached spiral-rotatably to the outer circumference of the shoe mold 11. At a lower end portion on the inner circumference of the tightening ring 14, a rib 14b is formed, with which a holding plate 13 engages. To the holding plate 13, a lock base 15 is attached. With this configuration, the lock base 15 is held so as to be hung from the tightening ring 14.

The tightening ring 14 and the lock base 15 are rotatable with respect to each other. However, a shaft 15c integrally formed with the lock base 15 is inserted into a hole 11b formed in the shoe mold 11, so that the rotation of the lock base 15 is inhibited. Therefore, in accordance with the spiral rotation (lock operation and unlock operation) of the tightening ring 14, the lock base 15 does not rotate but moves vertically.

The vertical direction that is a second direction is a direction orthogonal to the mounting (insertion) direction of the shoe bracket 17 to the accessory shoe AS of the camera. The mounting (insertion) direction corresponds to a first direction. The shoe mold 11, the tightening ring 14, the lock base 15, the shoe bracket 17 and a later described lock pin 8 constitute a lock mechanism. The operation of the lock mechanism will be described later.

At a central region of the shoe mold 11, a plurality of signal pins 10 are inserted, which serve as contact members electrically connecting with the accessory shoe AS provided on the camera (hereinafter also referred to as the camera-side accessory shoe AS). Around an outer circumference of each signal pin 10, a contact spring 9 is disposed. The lower edge of the contact spring 9 is in contact with a step portion formed in the signal pin 10.

On an upper face of the shoe mold 11 with the plurality of signal pins (hereinafter also referred to as flash-device-side signal pins) 10 inserted therein, a retaining plate 5 made of resin and a GND plate 4 made of metal are placed. At each of the four corners of these retaining plate 5 and GND plate 4, a screw 3 is inserted, where the screw 3 penetrates through the shoe mold 11 to be tightened with the shoe bracket 17. The upper edge of each contact spring 9 contacts a lower face of the retaining plate 5. With this configuration, the contact springs 9 are compressed, thus generating a biasing force causing the signal pins 10 to protrude from the shoe bracket 17 downward.

At the center of the lock pin 8 in its axis direction, an actuating plate 7 is attached, and a lower portion of the lock pin 8 in the axis direction is inserted into the hole 11c formed in the shoe mold 11 and a hole 17a formed in the shoe bracket 17. The lock pin 8 undergoes the downward biasing force from a lock pin spring 6. In the unlock state, the actuating plate 7 contacts the lock base 15, so that the lock pin 8 is held so as not to protrude from the lower face of the shoe bracket 17.

A drip-proof adaptor 16 made of an elastic material such as silicon rubber serving as a drip-proof member is fitted into a rib 15a formed on the outer circumference of the lock base 15. The drip-proof adaptor 16 moves vertically together with the lock base 15 as the tightening ring 14 moves vertically while rotating spirally. The shoe mold 11, the tightening ring 14 and the lock base 15 coupled with the tightening ring 14 via the holding plate 13 constitute a moving mechanism that causes the drip-proof adaptor 16 to move vertically.

When the lock mechanism is in a lock state, the tightening ring 14, the lock base 15 and the drip-proof adaptor 16 are located at a lower position (first position) with respect to the shoe mold 11. When the lock mechanism is in the unlock state, the tightening ring 14, the lock base 15 and the drip-proof adaptor 16 are located at an upper position (second position) with respect to the shoe mold 11. That is, in the unlock state, the drip-proof adaptor 16 is retracted upward from the position in the lock state.

Since the drip-proof adaptor 16 is simply fitted into the lock base 15 by its own elastic force, the drip-proof adaptor 16 can be detached from the lock base 15 easily. That is, the drip-proof adaptor 16 can be detachably attached (mounted).

The drip-proof adaptor 16 covers the outer circumference of the accessory-shoe connection part B provided on the flash device 50 (hereinafter also referred to as the flash-device-side accessory-shoe connection part B) including the shoe bracket 17 and the signal pins 10, and includes contact faces 16a, 16b and 16c that are continuous and can be in close contact with a contacted member of the camera, which will be described later. The contact faces 16a and 16b are at different vertical positions along the insertion direction into the camera-side accessory shoe AS, and the inclined contact face 16c joins the contact faces 16a and 16b.

That is, the drip-proof adaptor 16 has, in the mounting (insertion) direction of the flash device to the camera-side accessory shoe AS, a rear-end-side portion on which the contact face 16b is formed and a front-end-side portion on which the contact face 16a is formed. The drip-proof adaptor 16 has a shape such that the vertical position of the contact face 16b on the rear-end-side portion is lower than the vertical position of the contact face 16a on the front-end-side portion. In other words, the vertical length (length from the lower end of the tightening ring 14) of the rear-end-side portion of the drip-proof adaptor 16 is longer than that of the front-end-side portion.

Referring now to FIG. 4, the camera-side accessory shoe AS will be described. On the exterior member 23 of the camera, a shoe base 19 made of resin as a base of the camera-side accessory shoe AS is fixed together with the shoe plate 18 using screws, not shown. The shoe base 19 is a component obtained by insertion-molding with signal contacts 21 and 22.

The camera-side accessory shoe AS has the same configuration (shape and size) as that has been used conventionally for cameras.

The camera-side accessory shoe AS is provided with the shoe plate 18 made of metal, into which the above-described shoe bracket 17 is inserted from the front side of the camera (in the insertion direction orthogonal to the moving direction of the drip-proof adaptor 16) for engagement therewith. When viewed from the insertion direction of the shoe bracket 17, the shoe plate 18 includes right and left portions each being separated into upper and lower portions so that the right and left portions of the shoe bracket 17 can be inserted therebetween.

The shoe plate 18 further includes a lock hole 18a formed therein, with respect to which the above-described lock pin 8 is inserted and extracted. In the camera-side accessory shoe AS, a shoe spring 20 is provided for suppressing vertical backlash of the shoe bracket 17 (i.e., the flash device 50) inserted into the shoe plate 18.

The shoe base 19 includes ribs 19a, 19b and 19c that are formed integrally therewith, the ribs 19a, 19b and 19c continuously extending so as to surround the outer circumference of the camera-side accessory shoe AS (the signal contacts 21 and 22 and the shoe plate 18). The ribs 19a, 19b and 19c constituting a contacted member have the shapes enabling close contact with the contact faces 16a, 16b and 16c of the drip-proof adaptor 16. More specifically, the ribs 19a and 19b are at different vertical positions so that the shoe-bracket-entrance-side rib 19b is lower than the back-side rib 19a, and the inclined rib 19c joins these ribs 19a and 19b. That is, the shoe base 19 has in the mounting (insertion) direction of the flash device 50 to the accessory shoe AS a shoe-bracket-entrance-side portion (rib 19b) that is a rear-end-side portion and a back-side portion (rib 19a) that is a front-end-side portion and has a shape such that the vertical position (height) of the shoe-bracket-entrance-side portion is lower than that of the back-side portion.

FIG. 5 shows the state during the course when the flash device 50 is mounted to the camera-side accessory shoe AS. The accessory-shoe connection part B provided in the flash device 50 is in the unlock state.

The height of the shoe-bracket-entrance-side rib 19b of the shoe base 19 is set so as to leave a clearance d from the lower end of the signal pins 10 so that the rib 19b does not interfere with the flash-device-side signal pins 10. Meanwhile, as described above, the contact face 16a of the drip-proof adaptor 16 is located above the contact face 16b. Therefore, the shoe bracket 17 can be inserted into the shoe plate 18 without the interference of the contact face 16a of the drip-proof adaptor 16 with the rib 19a and the shoe plate 18. That is, in the upper position corresponding to the unlock state, the drip-proof adaptor 16 is retracted at a position avoiding the interference with the camera-side accessory shoe AS when the flash device 50 is mounted to the camera-side accessory shoe AS. Therefore, the drip-proof adaptor 16 does not interrupt the mounting of the flash device 50 to the camera-side accessory shoe AS.

If only the interference of the flash-device-side signal pins 10 with the ribs of the shoe base 19 has to be avoided, the height of the ribs of the shoe base 19 other than the rib 19b may be the same as that of the rib 19b, and the drip-proof adaptor 16 may have a shape corresponding to this. In this case, however, the drip-proof adaptor 16 has to be retracted considerably upward so as not to interfere with the camera-side accessory shoe AS (shoe plate 18). This results in the upsizing of the flash-device-side accessory-shoe connection part B. Therefore, providing the contact faces 16a and 16b at different vertical positions in the drip-proof adaptor 16 and contact faces of the ribs 19a and 19b at different vertical positions in the shoe base 19 can reduce the moving amount of the drip-proof adaptor 16, which is effective for the downsizing of the flash-device-side accessory-shoe connection part B.

Figure 6:
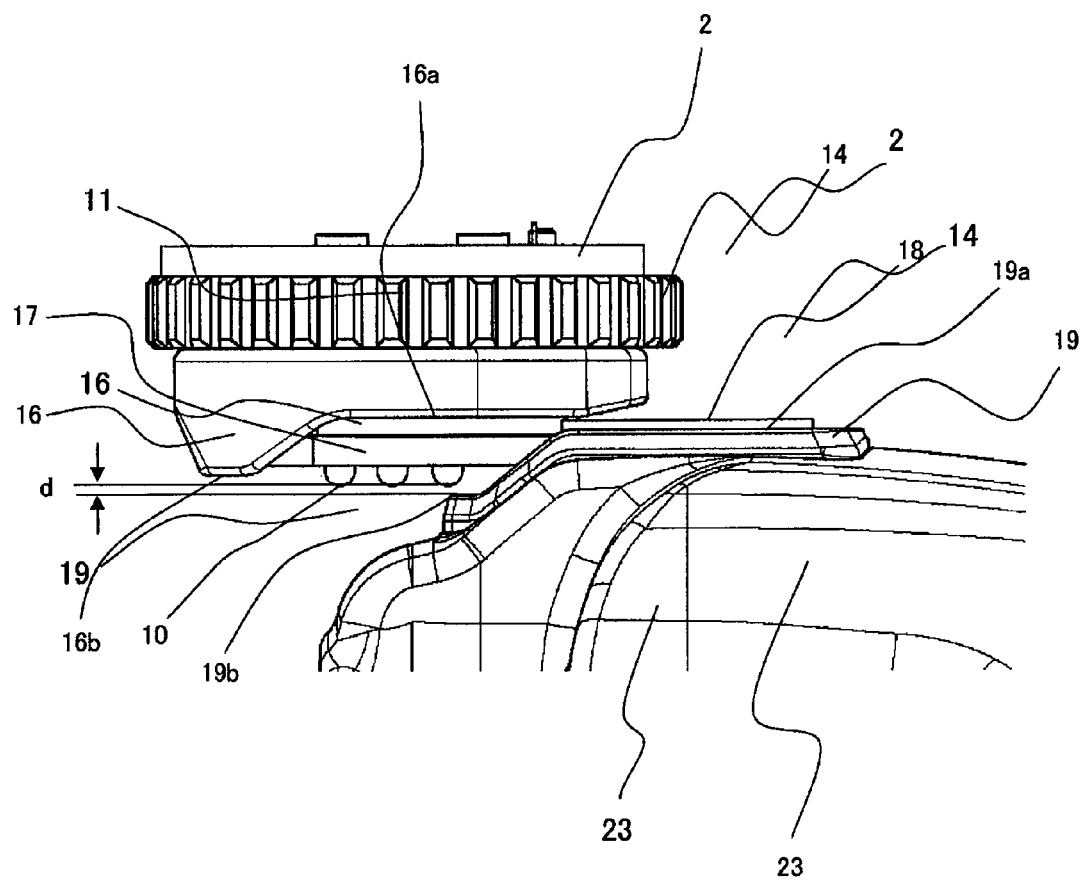
FIG. 6 is a side view showing the state where the flash device is mounted to the camera for locking.
Figure 7:
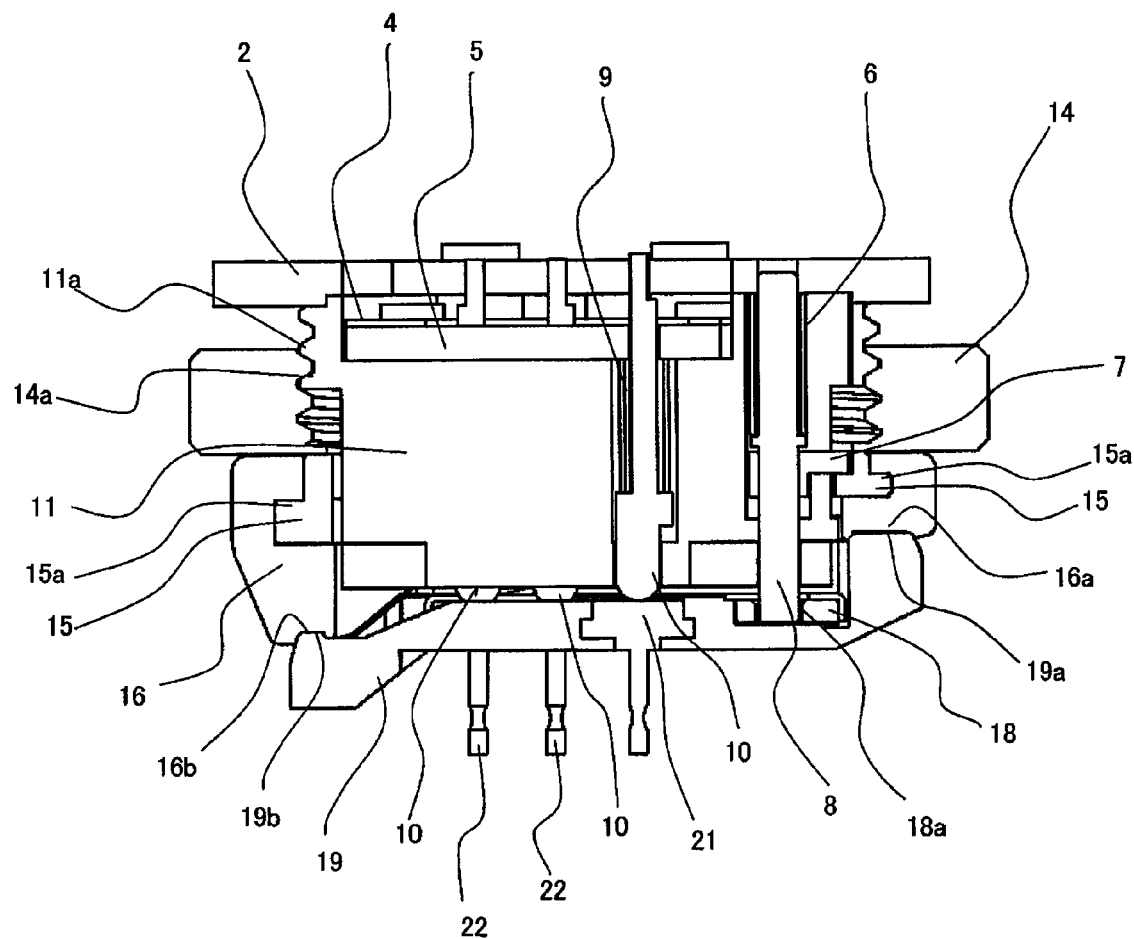
FIG. 7 is a side view in cross section of the accessory-shoe connection part and the accessory shoe in the state of FIG. 6.
Figure 8:
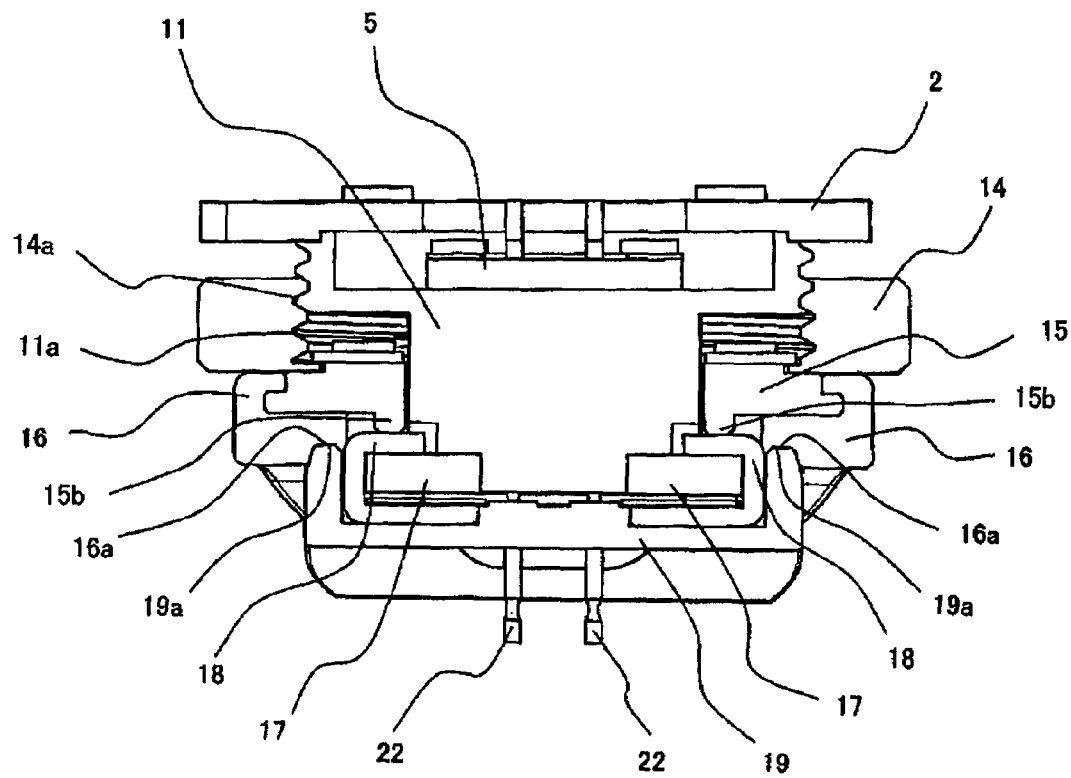
FIG. 8 is a front view in cross section of the accessory-shoe connection part and the accessory shoe in the state of FIG. 6.

FIG. 6 shows the state where the accessory-shoe connection part B of the flash device 50 is mounted to the accessory shoe AS of the camera and the lock mechanism is operated for locking. FIG. 7 is a cross-sectional view of the accessory-shoe connection part B and the accessory shoe AS in the same state taken along the flash-device mounting direction. FIG. 8 is a cross-sectional view of the accessory-shoe connection part B and the accessory shoe AS in the same state taken along the direction orthogonal to the flash-device mounting direction.

In order to mount (insert) the accessory-shoe connection part B to the accessory shoe AS for locking, the tightening ring 14 is rotated to the locking direction from the illustrated state of FIG. 3 (unlock state). Thereby, the lock base 15 moves downward together with the tightening ring 14 with respect to the shoe mold 11 and then a protrusion 15b (see FIG. 8) formed on a lower face of the lock base 15 comes into contact with the upper face of the shoe plate 18. When the tightening ring 14 is further rotated to the locking direction, the shoe plate 18 is sandwiched between the lock base 15 (protrusion 15b) and the shoe bracket 17 by the tightening force generated by the screw effect of the tightening ring 14.

In addition, the lock base 15 moves downward so as to allow the actuating plate 7 attached to the lock pin 8 to move downward, whereby the lock pin 8 undergoing a biasing force of the lock pin spring 6 is inserted into the lock hole 18a provided in the accessory shoe AS. This can prevent the dropping-off of the flash device 50 from the accessory shoe AS.

During the shift from the unlock state to the lock state, the drip-proof adaptor 16 moves downward together with the lock base 15, and the contact faces 16a, 16b and 16c thereof are brought into contact (close contact) with the ribs 19a, 19b and 19c of the shoe base 19. Thereby, a drip-proof space is formed around the flash-device-side signal pins 10 and the camera-side accessory shoe AS (e.g., signal contacts 21 and 22), where the intrusion of water droplets is prevented.

As described above, the drip-proof adaptor 16 is made of an elastic material. Therefore, the height of the drip-proof adaptor 16 is set so that, when the operation of the tightening ring 14 to the locking direction has been completed, the drip-proof adaptor 16 being in contact with the ribs 19a, 19b and 19c of the shoe base 19 is deformed elastically, whereby both can be in close contact with each other under pressure, thus making it possible to obtain a good drip-proof effect.

As described above, according to the present embodiment, in the state where the drip-proof member (drip-proof adaptor 16) is retracted at the second position, the accessory device (flash device 50) is mounted to the accessory shoe of the image-pickup apparatus, and then the lock operation is performed with the locking mechanism so that the drip-proof member is moved to the first position, thus forming the drip-proof space around the contact member and the accessory shoe. That is, the use of the drip-proof member movable independent of the accessory shoe can lead to a favorable drip-proof effect without interrupting the mounting of the accessory device to the accessory shoe. Thus, the compatibility with the image-pickup apparatus provided with a conventionally configured accessory shoe and a favorable drip-proof performance both can be achieved.

The present invention is not limited to these embodiments and various variations and modifications may be made without departing from the scope of the present invention.

Although the above embodiment described the case where the ribs 19a, 19b and 19c are integrally formed with the shoe base 19, a contacted member (rib) may be a component separate from the shoe base. In this case, the drip-proof adaptor 16 may not have elasticity, but a component corresponding to the rib may have elasticity.

In addition, as described above, the drip-proof adaptor 16 can be detachably attached to the lock base 15. Therefore, in the case where the camera is provided with a shoe base having a shape different from that of the shoe base 19 of FIGS. 4 to 6, a drip-proof adaptor matching with the different shape of the shoe base or an exterior member can be attached to the lock base 15. Thereby, even the combination of a camera other than the camera shown FIGS. 4 to 6 with the flash device 50 can achieve a high drip-proof effect.

Furthermore, if a drip-proof effect is not required, the flash device 50 may be mounted to the accessory shoe of the camera without the drip-proof adaptor 16.

Moreover, in the above embodiment, the reasons why the ribs 19a, 19b and 19c (shoe base 19) are components separate from the exterior member 23 of the camera are as follows. Firstly, matte coating is often applied to the exterior member of the camera, and in such a case, minute asperities on the coated surface may cause the deterioration of the drip-proof effect, which is obtained from the close contact with the drip-proof adaptor. Secondly, especially in the case of a metal exterior member, it becomes difficult to ensure accuracy for the lower position of the drip-proof adaptor.

However, if these problems can be solved and the drip-proof effect can be ensured, the contacted member corresponding to the ribs can be integrally formed with the exterior member.

Furthermore, the present invention is not limited to these preferred embodiments and various variations and modifications may be made without departing from the scope of the present invention.

This application claims foreign priority benefits based on Japanese Patent Application No. 2007-007592, filed on Jan. 17, 2007, which is hereby incorporated by reference herein in its entirety as if fully set forth herein.

What is claimed is:

1. An accessory device detachably mounted to an accessory shoe of an image-pickup apparatus, comprising:
    a contact member that electrically connects with the accessory shoe;
    a lock mechanism that allows a lock operation for fixing the accessory device to the accessory shoe and an unlock operation for releasing the fix of the accessory device;
    a drip-proof member that forms a drip-proof space around the contact member and the accessory shoe when the drip-proof member contacts the image-pickup apparatus; and
    a moving mechanism that moves, in response to the lock operation, the drip-proof member to a first position where the drip-proof member is allowed to be brought into contact with the image-pickup apparatus, and that moves, in response to the unlock operation, the drip-proof member to a second position where the drip-proof member is retracted from the first position,
    wherein the accessory device is mounted to the accessory shoe in a first direction orthogonal to a second direction in which the drip-proof member moves between the first and second positions, and
    wherein, the drip-proof member has a front-end-side portion and a rear-end-side portion in the first direction and has a shape such that a length of the rear-end-side portion in the second direction is longer than that of the front-end-side portion to avoid at the second position an interference with the accessory shoe during mounting of the accessory device to the accessory shoe.

2. An accessory device according to claim 1, wherein the drip-proof member is detachably held by the accessory device.

3. An image-pickup apparatus comprising:
    an accessory shoe to which an accessory device according to claim 1 is detachably mounted; and
    a contacted member with which the drip-proof member of the accessory device mounted to the accessory shoe is brought into contact when the drip-proof member is located at the first position,
    wherein the contacted member has a front-end-side portion and a rear-end-side portion in the first direction and has a shape such that a height of the rear-end-side portion of the contacted member in the second direction is lower than that of the front-end-side portion thereof.

* * * * *